(12) United States Patent
Hagmann

(10) Patent No.: US 6,290,236 B1
(45) Date of Patent: Sep. 18, 2001

(54) HOUSING SEAL FOR CABLE THROUGH DUCT APERTURES

(75) Inventor: Bernd Hagmann, Geislingen (DE)

(73) Assignee: Richard Hirschmann GmbH & Co., Neckartenzlingen (DE)

( * ) Notice: Subject to any disclaimer, the term of this patent is extended or adjusted under 35 U.S.C. 154(b) by 0 days.

(21) Appl. No.: 09/029,969

(22) PCT Filed: Jul. 17, 1996

(86) PCT No.: PCT/EP96/03137

§ 371 Date: Mar. 10, 1998

§ 102(e) Date: Mar. 10, 1998

(87) PCT Pub. No.: WO97/13306

PCT Pub. Date: Apr. 10, 1997

(30) Foreign Application Priority Data

Sep. 29, 1995 (DE) ............................................. 195 36 456

(51) Int. Cl.⁷ .............................. F16L 5/02; H02G 3/22; H02G 15/013
(52) U.S. Cl. .......................... 277/602; 277/616; 277/626; 277/630; 277/641; 277/644; 16/2.1; 16/2.2
(58) Field of Search .................................... 277/616, 626, 277/630, 641, 644; 16/2.1, 2.2

(56) References Cited

U.S. PATENT DOCUMENTS

| | | | |
|---|---|---|---|
| 2,974,186 | * | 3/1961 | Klumpp, Jr. ........................ 16/2.2 X |
| 3,244,802 | * | 4/1966 | Sturtevant et al. .................. 16/2.2 X |
| 3,329,762 | * | 7/1967 | Miller ................................. 16/2.2 X |
| 4,656,689 | * | 4/1987 | Dennis .................................... 16/2.2 |
| 4,901,395 | * | 2/1990 | Semrau .............................. 277/616 X |
| 5,199,724 | * | 4/1993 | Meltsch et al. ................... 277/616 X |
| 5,245,131 | * | 9/1993 | Golden et al. .................... 277/616 X |
| 5,504,276 | * | 4/1996 | Kunze ............................... 16/2.2 X |
| 5,545,854 | * | 8/1996 | Ishida ................................ 16/2.2 X |

FOREIGN PATENT DOCUMENTS

| | | |
|---|---|---|
| 3237698 | 4/1983 | (DE) . |
| 9102752 | 5/1991 | (DE) . |
| 2636790 | 3/1990 | (FR) . |

* cited by examiner

*Primary Examiner*—Anthony Knight
*Assistant Examiner*—Desmond Peyton
(74) *Attorney, Agent, or Firm*—Fulbright & Jaworski LLP

(57) ABSTRACT

In the case of a housing seal (3, 3') for cable through-duct apertures that can be inserted into receptacles (2, 2') for the cable through-duct apertures, whereby housing seal (3, 3') has at least two sealing areas (7, 7' or 9, 9') with different sealing contours and can be inserted into receptacles (2, 2') in different directions as desired, a low overall height and the use of the housing seal with the same shape for the inlet and outlet apertures of a housing are possible even when asymmetrically profiled cables are used if two sealing areas (7, 7' or 9, 9') are provided on adjacent sides of housing seal (3, 3'), whereby one side points in the direction of the cable through-duct.

21 Claims, 2 Drawing Sheets

HOUSING SEAL FOR CABLE THROUGH DUCT APERTURES

BACKGROUND OF THE INVENTION

1. Field of the Invention

The invention relates to a housing seal for cable through-duct apertures which can be inserted into a receptacle for the cable through-duct apertures. The housing seal has at least two sealing areas with different sealing contours and can be inserted into the receptacle in different directions as desired.

2. Discussion of the Related Technology

A sealing element for a cable through-duct aperture is known from FR-A-26 36 790. The sealing element is made of an elastic material and is provide with holes with different diameters for cables of different thicknesses. The cables can be inserted into the holes with corresponding inside diameters via slots in the elements. The elements are then inserted into corresponding receptacles of a housing. To close and seal the holes in which there are no cables, additional parts are provided that are inserted into the open holes. Several parts that must be kept in stock and must be present at the site of installation are necessary for this purpose, thereby increasing production and storage costs.

An equipment housing with a cable insertion aperture having a reversible slide that is guided into guide grooves is disclosed in DE-A-40 07 029. Depending upon the direction of insertion into the guide grooves, said slide either closes the cable aperture or secures the cable in the insertion aperture. On the side faces of the slide, detentes are provided that keep the slide in its position when supported on a housing edge. This arrangement is not intended for sealing a cable insertion aperture, nor is it suitable for doing so, since sealing elements are not used. In addition, when sealing elements are used for sealing, it is not possible to maintain sufficient pressure by the detentes to ensure reliable sealing over along period.

A closure element for cable passages in walls, for example in fire walls between the engine compartments and passenger compartments of motor vehicles, is disclosed in DE-C-43 10 451. The closure element presses on the cable that goes through the fire wall and as a result makes it possible to insulate against sound, water, or odor with the cables inserted. This known closure element and its arrangement are neither intended nor suitable, however, for closing or sealing the wall passage when cables are not installed.

DE-U-91 02 752 calls for an arrangement for strain relief for a cable with a polygonal plate that is to be inserted into a housing. The plate has recesses that vary in contour on their narrow sides and can be detachably inserted into a housing pocket of an arm. Strain relief for cables with different diameters can be ensured by the different recesses in the contour and corresponding insertion of the polygonal plate into the housing pocket. This known device for strain relief is, however, not intended or suitable for a housing seal since the recesses that do not receive any cables allow free passage into the inside of the housing. To close these passages, additional closure seals would be necessary.

In the un-prepublished German Patent Application 44 39 784 from the same applicant, a housing seal for cable through-duct apertures is disclosed. In at least two sealing areas of the housing seal, sections are provided that lie beside one another relative to the through-duct device. The sections rest on different support surfaces with the housing seal inserted into the receptacle in different directions as desired. This housing seal has proven itself very well. Owing to the design of the areas of the sections of the housing seal that are side-by-side and complementary to the support surfaces, the height of the housing seal cannot, however, be reduced below a certain value. Therefor, the housing seal and thus also the receptacle for the housing seal on the housing have relatively large dimensions. Moreover, the housing seal has drawbacks when asymmetrical cable contours, especially asymmetrical flat cables, are used. When such asymmetrical cables are looped through a housing, two different seals are necessary that are rotated by 180° with respect to the asymmetry of the cable. Owing to the sections that lie together relative to the through-duct direction, one of which has the cable-sealing contour, a single seal is therefore not sufficient.

SUMMARY OF THE INVENTION

The object of the invention is therefore to provide a housing seal even for an asymmetrical cable contour without, in the case of an asymmetrical cable looping through a housing for the inlet and outlet of the asymmetrically profiled cable, different housing seals being necessary. Moreover, the housing seal should have the lowest possible overall height.

This object is achieved according to the invention in that the sealing areas on adjacent sides of the housing seal are provided, whereby one side points in the direction of the cable through-duct. Because of these features of the invention, it is not only possible to provide reversing seals with a low overall height, but especially also for cables, especially flat cables with asymmetrical cable contours, whereby this housing seal according to the invention can be used in opposing apertures of a housing if an asymmetrically profiled cable is looped through this housing. With the housing seal according to the invention, production and storage costs are therefore kept down.

According to a preferred embodiment of the invention, one of the adjacent sides of the housing seal that are orthogonal to one another is flat. If this housing seal is inserted into the receptacle in such a way that the flat side points upward, the housing is sealed in cases where no cable is guided through the cable through-duct aperture. According to this embodiment, the entire surface of this flat side rests without profiling on the opposite surface of the housing, so that owing to the relatively large sealing surface a reliable seal is ensured.

One of the sides of the housing seal that are adjacent to one another has profiling that corresponds to the cable contour. By removing the housing seal from the receptacle and rotating 90° around an axis that points crosswise to the direction of the cable through-duct, it is therefore possible in a simple way to seal a housing aperture with the same element both when a cable passes through the housing aperture and when there is no cable passing through.

According to a very advantageous embodiment of the invention, one side of the housing seal has profiling that corresponds to an asymmetrical cable contour, especially an asymmetrical flat cable contour. When asymmetrical flat cables are used and they are looped through a housing with opposing apertures, the same housing seal can therefore be used so that even in this case, no additional housing seal with a different or mirror-symmetrical contour is necessary.

According to another advantageous embodiment of the invention, the housing seal and the receptacle in each case have complementary coding devices, preferably at least one lug and a corresponding recess, to ensure correct left-to-right insertion of the housing seal into the receptacle. In this way, improper installation is prevented or made obvious since the housing seal can thus be inserted into the receptacle only in the prescribed way.

The invention is explained below based on an embodiment with reference to the figures.

DETAILED DESCRIPTION OF THE PREFERRED EMBODIMENTS

Figure 1:
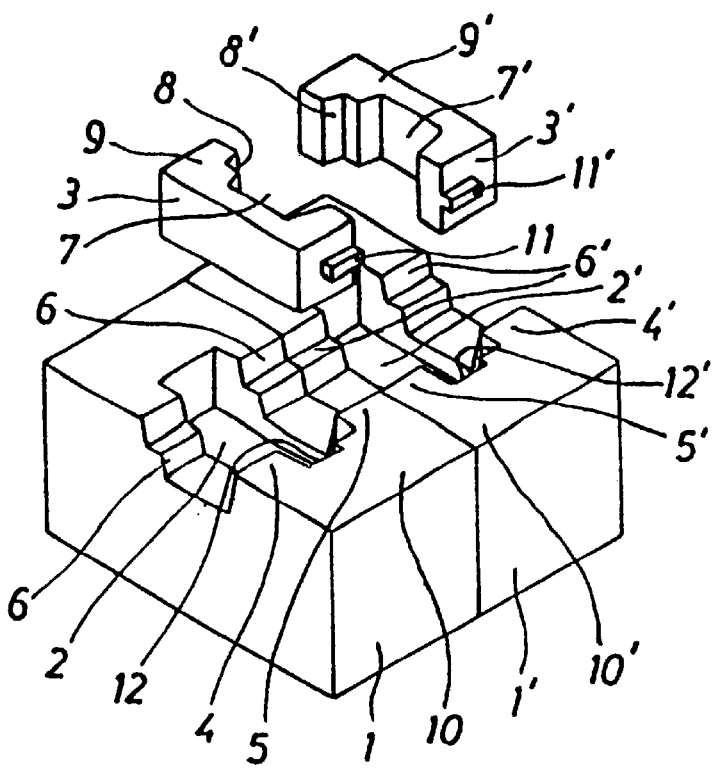
FIG. 1 shows two opposing housing walls with housing receptacles, as well as the corresponding housing seals in perspective schematic representation.
Figure 2:
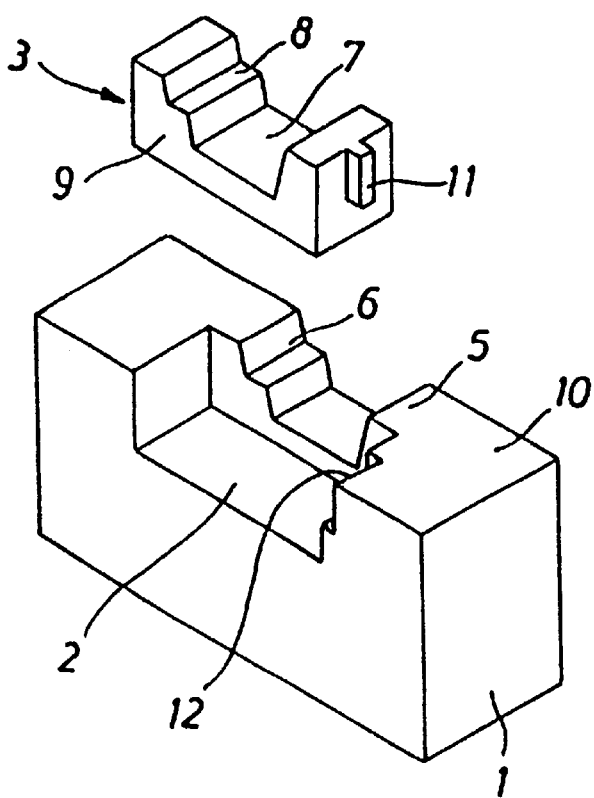
FIG. 2 shows a cross-section through a housing wall or a housing-seal-receptacle, as well as the housing seal in another spatial arrangement with regard to the receptacle, in each case in a perspective schematic representation.

The cable through-duct devices that are depicted in FIGS. 1 and 2 are provided in this embodiment for flat cables that are asymmetrically profiled. As FIGS. 1 and 2 show, housing walls 1, 1' in each case have receptacles formed by receiving chambers 2, 2' for receiving housing seals 3, 3'. Walls 4, 5 or 4', 5' of receiving chambers 2, 2' are equipped with asymmetrical contours according to the representation in FIG. 2, whereby lateral contours 6, 6' are made on the side facing away from the person observing the drawing.

Housing seals 3, 3' also accordingly have asymmetrical profilings 7, 7', whereby again steps 8, 8' are provided on the inside of the housing seal that faces away from the observer. If housing seals 3, 3' are inserted into receiving chambers 2, 2' in the direction that is depicted in FIG. 2, contours 6, 6' of chamber walls 4, 4' are aligned with contours 8, 8' of housing seals 3, 3'. The corresponding profiled asymmetrical flat cable is thus securely guided into the housing seal and sealed.

If no cable is to be guided through the housing aperture, the latter is sealed in a simple way such that its housing seal 3 or 3' is rotated 90° from the position depicted in FIG. 2 around an axis that extends crosswise to the cable through-duct direction and is then inserted again into receiving chamber 2 or 2' (cf. FIG. 1). Flat side 9, 9' of housing seal 2, 2' that now points upward is now aligned with top side 10, 10' of housing wall 1, 1' and forms a secure and reliable seal if no cable is guided through the housing aperture.

Figure 3:
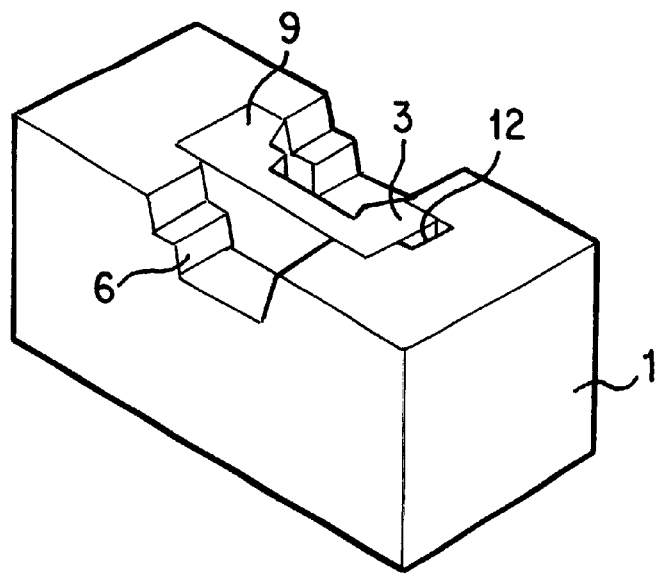
FIG. 3 is a perspective view of a housing wall with a housing seal inserted to seal closed a through-duct aperture.
Figure 4:
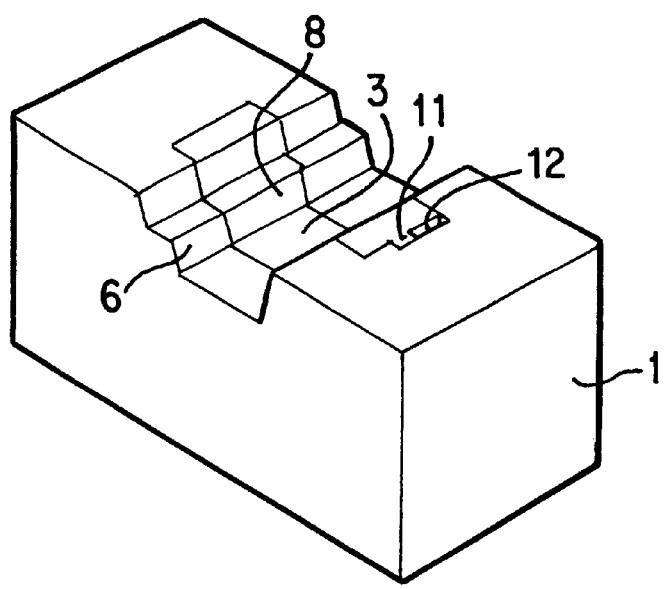
FIG. 4 is a perspective view of a housing wall with a housing seal of FIG. 3 rotated 90° to guide and secure a cable through the correspondingly contoured aperture.

As especially FIG. 1 shows, a single housing seal shape is sufficient to seal the housing aperture even when an asymmetrically profiled cable or flat cable is looped through both on the inlet wall and on the opposing outlet wall of the housing. The housing seals have lugs 11, 11', which in various insertion directions in each case engage in complementary recesses 12, 12' on housing wall 1, 1' or receiving chambers 2, 2'. When rotated by 180°, i.e., when lugs 11, 11' of housing seal 3, 3' thus point in the other direction, insertion of housing seal 3, 3' into receiving chamber 2, 2' is not possible since there are no recesses for lugs 11, 11' of housing seal 3, 3' on the rear side of the receiving chamber. In this way, improper installation is prevented or is very obvious. Additional views of the housing seal and housing wall show the seal positioned to seal closed a through-duct (FIG. 3) and rotated 90° to guide and secure a cable through the aperture (FIG. 4.)

The invention was described based on a preferred embodiment. Modifications and configurations of the housing seal according to the invention or the receiving chambers that are provided for it are also possible for one skilled in the art, without exceeding the scope of the invention. For example, it is possible to prevent improper installation by ensuring that at least one side of housing seal 3, 3' has an angular surface that is different from the complementary surface of receiving chamber 2, 2'.

What is claimed is:

1. A housing seal for a cable through-duct aperture comprising:

at least two outer sealing surfaces with different preformed sealing contours wherein the two outer sealing surfaces are provided on adjacent orthogonally intersecting outer surfaces of said housing seal, whereby one of said surfaces points in the direction of the cable through-duct aperture and one of said preformed sealing surfaces has preformed profiling corresponding to a cable contour.

2. A housing seal according to claim 1, wherein one of said two outer sealing surfaces is flat.

3. A housing seal according to claim 2, wherein said preformed profiling is adapted to receive an asymmetrical cable contour.

4. A housing seal according to claim 3, wherein said preformed profiling is adapted to receive a flat cable.

5. A housing seal according to claim 2, further comprising complementary coding devices for correct left-to-right insertion of said housing seal into a receptacle.

6. A housing seal according to claim 1, wherein said preformed profiling is adapted to receive an asymmetrical cable contour.

7. A housing seal according to claim 6, wherein one of said two outer sealing surfaces is adapted to receive a flat cable.

8. A housing seal according to claim 6, further comprising complementary coding devices for correct left-to-right insertion of said housing seal into a receptacle.

9. A housing seal according to claim 1, further comprising complementary coding devices for correct left-to-right insertion of said housing seal into a receptacle.

10. A housing seal according to claim 9, wherein said preformed profiling is adapted to receive a flat cable.

11. A housing seal positionable within an aperture for alternatively (i) sealing and (ii) guiding a cable through the aperture, comprising:

a body portion in the general shape of a rectangular solid except with one face having a relieved central portion forming a contoured surface corresponding to a contour of the cable, an opposite side and a pair of parallel sides orthogonal to said one face being substantially flat.

12. A housing seal according to claim 11 further comprising complementary coding devices for correct left-to-right insertion of said housing seal into a receptacle formed in a surface of material surrounding the aperture.

13. A housing seal according to claim 11 wherein said contoured surface is preformed to receive a flat cable.

14. A housing seal according to claim 11 wherein said contoured surface is asymmetric to receive an asymmetrical cable contour.

15. A housing seal according to claim 14 further comprising complementary coding devices for correct left-to-right insertion of said housing seal into a receptacle formed in a surface of material surrounding the aperture.

16. A seal receivable within an aperture formed in a wall and mountable in said aperture in (i) a first orientation scaling said aperture closed, and (ii) a second orientation conforming to a contour of a cable passing through said aperture, said first and second orientations corresponding to different angular orientations of said seal relative to the wall.

17. A seal according to claim 16 wherein said different angular orientations differ by an angle of rotation of said seal of 90 degrees.

18. A seal according to claim 17 wherein the aperture is part of a cable through-duct and said angle of rotation is about an axis orthogonal to a direction of the cable through-duct.

19. A seal according to claim 16 wherein said seal is retained within a receptacle adjacent said aperture.

20. A seal according to claim 19 further comprising complementary coding devices for correct left-to-right insertion of said seal into said receptacle.

21. A seal according to claim 16 having a first face with a contoured portion corresponding to a contour of the cable and a second face configured to seal said aperture closed.

* * * * *